United States Patent [19]

Hirai et al.

[11] Patent Number: 5,200,159
[45] Date of Patent: Apr. 6, 1993

[54] PURIFIED SOLUTION CONTAINING IRON AND MANGANESE, AND METHOD PRODUCING THEREOF

[75] Inventors: Naoe Hirai, Yokohama; Tohoru Murase, Ichikawa; Teruo Mori, Sakura; Katsunobu Okutani, Ichikawa, all of Japan

[73] Assignees: Chemirite, Ltd.; TDK Corporation, both of Tokyo, Japan

[21] Appl. No.: 422,798

[22] Filed: Oct. 17, 1989

[30] Foreign Application Priority Data

Oct. 17, 1988 [JP] Japan .................................. 63-259448

[51] Int. Cl.$^5$ ............................................. C01G 3/04
[52] U.S. Cl. ...................................................... 423/140
[58] Field of Search .......................................... 423/140

[56] References Cited

U.S. PATENT DOCUMENTS

| | | | |
|---|---|---|---|
| 1,773,235 | 8/1930 | Mitchell | 423/140 |
| 2,423,385 | 7/1947 | Hixson | 423/142 |
| 3,781,405 | 12/1973 | Allan | 423/140 |
| 3,903,236 | 9/1975 | McCutcheon | 423/140 |
| 4,026,773 | 5/1977 | Van Peteghem | 423/140 |

*Primary Examiner*—Peter D. Rosenberg
*Attorney, Agent, or Firm*—Finnegan, Henderson, Farabow, Garrett & Dunner

[57] ABSTRACT

A purified solution containing iron chloride and manganese chloride, having a phosphorus content not higher than about 0.007 wt. % with respect to the total content of iron and manganese. The method for producing the purified solution comprises the steps of dissolving manganese containing raw material in hydrochloric solution; oxidizing the solution; adjusting the pH of the solution to 2.5~4.5 to form insolubles; and separating the insolubles from the solution. This solution can be utilized to produce a mixed powder of an iron oxide and a manganese oxide. The mixed powder is useful for producing a high-quality soft ferrite.

3 Claims, 1 Drawing Sheet

PURIFIED SOLUTION CONTAINING IRON AND MANGANESE, AND METHOD PRODUCING THEREOF

BACKGROUND OF THE INVENTION

1. Field of the Invention

The present invention relates to a purified solution containing iron chloride and manganese chloride and to a method for producing the solution. The purified solution is oxidized by roasting in order to produce a mixed oxide powder containing iron and manganese, thus being useful as a raw material for manufacturing a high-quality soft ferrite of excellent magnetic properties.

2. Prior Art

To manufacture soft ferrite, an iron oxide powder, a manganese oxide powder and other metal oxide powders, for example, zinc oxide powder are prepared. Also, a compounded powder with a compounding ratio of $Fe_2O_3$:$MnO$:$ZnO$, for example, 70.6:14.2:15.2 in weight is produced. The compounded powder is then sintered at about 1,300° C. and soft ferrite is manufactured. To manufacture ordinary soft ferrite of ordinary magnetic properties, an iron oxide powder of ordinary grade is used.

In prior art methods, iron oxide powder of ordinary grade is produced by roasting a waste hydrochloric pickling solution of steel. In the roasting furnace at about 700° C., iron chloride in the solution is oxidized according to the following formula (1).

$$2FeCl_2 + H_2O + O_2 \rightarrow Fe_2O_3 + 2HCl \qquad (1)$$

In the above methods, a waste hydrochloric pickling solution is sprayed into the roasting furnace, and powdered $Fe_2O_3$ is obtained from the roasting furnace. Gaseous HCl in the discharged gas is changed to aqueous hydrochloric acid by any of several known methods. In general, this method is simple and the iron oxide powder produced is low in cost. Accordingly, the iron oxide powder thus obtained is widely used for manufacturing ordinary soft ferrite with ordinary magnetic properties.

However, the iron oxide powder produced by this process is not used for high-quality soft ferrite where more superior magnetic properties are required. In this particular method as explained, all impurities contained in the steel are dissolved in the waste hydrochloric pickling solution, and therefore are also included in the iron oxide powder. These impurities in the iron oxide powder impair the magnetic properties of the soft ferrite. In manufacturing the high-quality soft ferrite, expensive oxide powders of high purity, i.e. a high purity iron oxide and a high purity manganese oxide, are exclusively used. Table 1 shows an example of the impurity content of iron oxide powder and manganese oxide powder for soft ferrite, as well as the impurity content of other materials which can be used as raw materials for both oxides. In Table 1, high-purity iron oxides A or B, and high purity manganese oxide are used for high-quality soft ferrite, and ordinary iron oxide is used for ordinary soft ferrite.

In another prior art method, high-purity iron oxides A or B are produced by a crystal refining method. In the crystal refining method the crystals of iron sulphate or iron chloride are crystallized from the aqueous solution thereof, and these crystals are oxidized by roasting to obtain an iron oxide. In this method, however, the impurities are not reduced sufficiently by a single crystallization, because part of the impurities are mixed in the crystals. Thus, the obtained crystals are dissolved again in water, etc., and the crystallization treatments are repeated, thereby reducing the impurity content. According to this method, an iron oxide powder of high purity, such as the high-purity iron oxides A or B in Table 1, can be obtained. However, the crystal refining method is complicated and the production cost of the iron oxide powder is high because of the repeated crystallizations.

Also in case of manganese oxide, impurities can be reduced by electrolysis or by the crystal refining method, but the process is complicated and the cost is high, as in the case of the high purity iron oxides.

Thus, general knowledge about the kind of impurities, as well as the permissible content level of the impure elements in the powdered oxide, which impair the magnetic properties of a high quality soft ferrite, has been insufficient. Another method to improve the powdered oxide of ordinary grades to a level sufficient for high-quality soft ferrite has not been found, the oxide powders produced by the crystal refining method, where impurities are significantly decreased for the formation of high quality soft ferrite, are very expensive.

SUMMARY OF THE INVENTION

It is therefore an object of the present invention to produce a new hydrochloric solution which contains substantially higher contents of iron and manganese, and in which harmful impurities are selectively removed sufficiently and from which an oxide powder suitable for high quality soft ferrite can be obtained by the same roasting methods as those in the oxide powder of ordinary grades.

TABLE 1

| Classification | Raw Material Item | Composition (wt. %) | | | | | | | | |
|---|---|---|---|---|---|---|---|---|---|---|
| | | Fe | Mn | Si | Al | Cr | Cu | Ni | P | Ca |
| Iron Raw Material | Ordinary Iron Oxide | ca. 70* | 0.23 | 0.012 | 0.03 | 0.03 | 0.01 | 0.02 | 0.016 | 0.01 |
| | High-purity Iron Oxide A | ca. 70* | 0.066 | 0.0020 | 0.001 | 0.001 | 0.001 | 0.006 | 0.0023 | 0.0025 |
| | High-purity Iron Oxide B | ca. 70* | 0.054 | 0.0055 | 0.002 | 0.007 | 0.001 | 0.003 | 0.0025 | 0.0035 |
| Manganese Raw Material | Electrolytic Metallic Manganese | 0.003 | * | 0.0035 | <0.001 | <0.001 | <0.001 | <0.001 | 0.0010 | — |
| | High-purity Manganese Oxide | 0.002 | ca. 72* | 0.0040 | <0.001 | <0.001 | <0.001 | <0.001 | 0.0008 | 0.003 |
| Iron-Manganese Mixed Raw | Ferro manganese A | 17 | 74* | 0.10 | 0.010 | 0.003 | 0.003 | 0.002 | 0.12 | — |
| | Ferro manganese B | 12 | 78* | 1.1 | 0.013 | 0.002 | 0.001 | 0.002 | 0.11 | — |

TABLE 1-continued

| Classification | Raw Material Item | Composition (wt. %) | | | | | | | |
|---|---|---|---|---|---|---|---|---|---|
| | | Fe | Mn | Si | Al | Cr | Cu | Ni | P | Ca |
| Material | Ferro manganese C | 3 | 90* | 0.89 | 0.014 | 0.001 | 0.001 | 0.001 | 0.036 | — |

*Balance

According to the present invention, a purified solution is obtained by a dephosphorizing treatment of a crude solution keeping a substantially high iron chloride and manganese chloride in the solution. The phosphorus content is decreased to not higher than 0.007 wt. % with respect to the total content of iron and manganese. In the above, the crude solution means a solution in which ferromanganese, manganese ore or high manganese steel are dissolved respectively or together in a hydrochloric acid solution or waste hydrochloric pickling solution of steel. According to the present invention, phosphorus contained in the soft ferrite distinctly impairs the magnetic properties, and by controlling the phosphorus content of the hydrochloric solution as explained above, a mixed oxide powder of iron and manganese in which the phosphorus content is sufficiently decreased can be obtained by the ordinary roasting method. Soft ferrite manufactured by using this mixed oxide powder has excellent magnetic properties because the phosphorus content is sufficiently lowered.

The purified solution of the present invention can be obtained according to the following steps. The 1st step is to oxidize the crude solution so that the phosphorus contained in the solution is oxidized to $P^{5+}$ state The 2nd step is to neutralize the solution to a pH of 2.5~4.5 so that insoluble $P^{5+}$ compounds are selectively formed in the solution. The 3rd step is to separate the insoluble compounds from the solution. From this, a purified solution due to the present invention, containing the phosphorus as specified above, can be obtained.

DETAILED DESCRIPTION OF THE PREFERRED EMBODIMENT OF THE INVENTION

Figure 1:
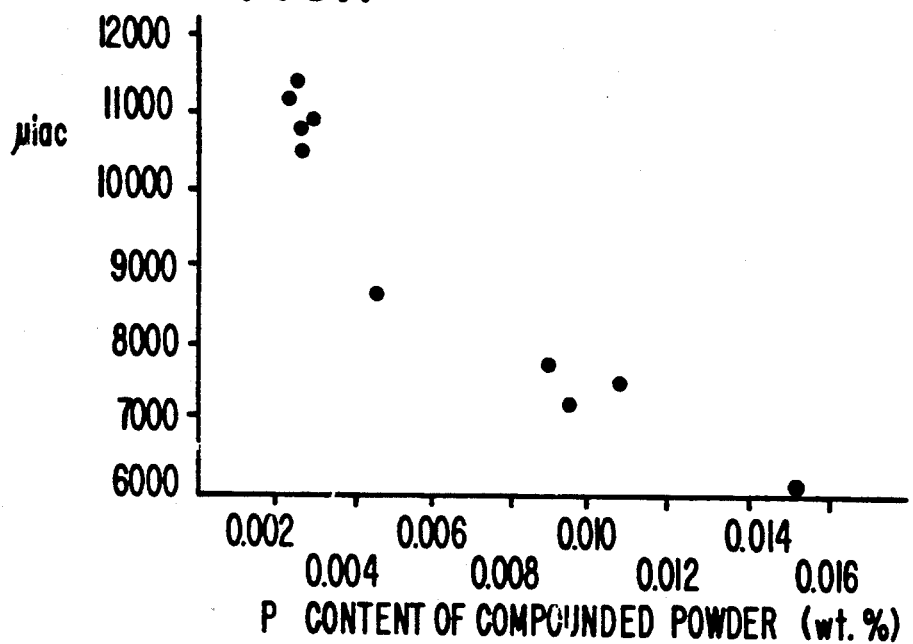
FIG. 1 shows the relation between the P content of compounded powder and AC initial magnetic permeability $\mu iac$ of the soft ferrite.
Figure 2:
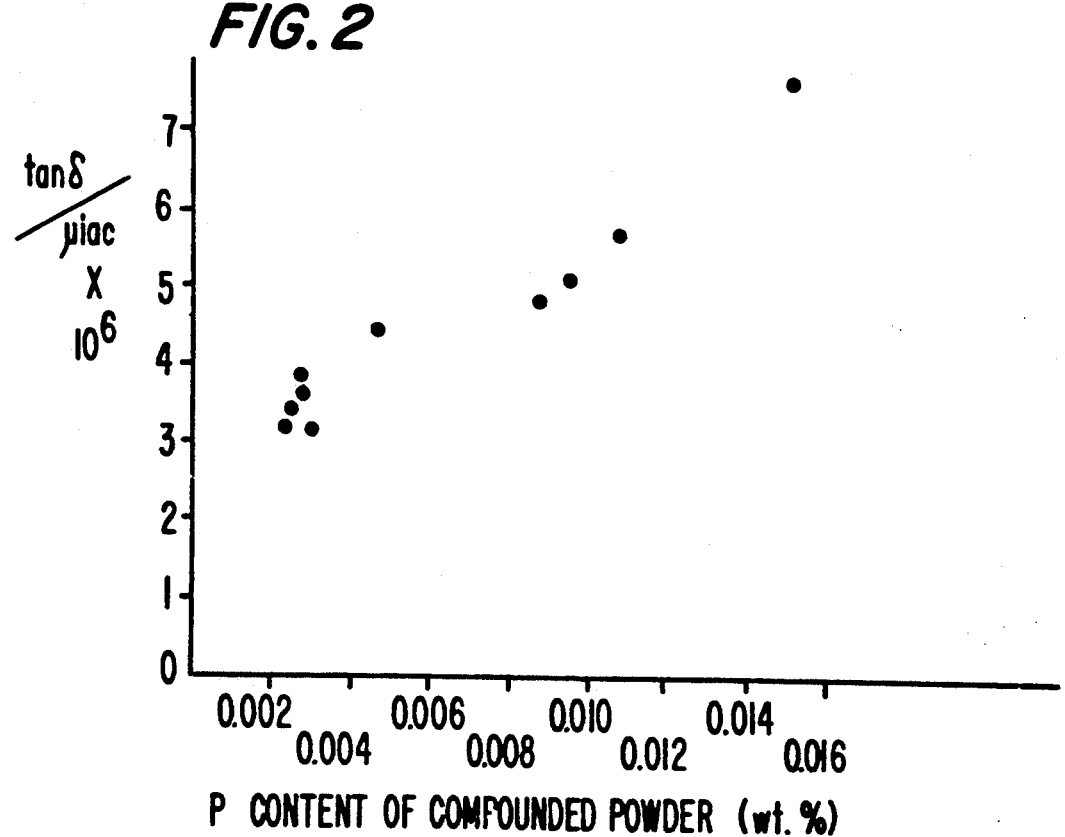
FIG. 2 shows the relation between the P content of compounded powder and the relative loss factor $tan\delta/\mu iac$ of the soft ferrite.

This invention relates to a purified solution containing iron chloride and manganese chloride wherein the phosphorus content is not higher than 0.007 wt. % with respect to the total content of iron and manganese. The reasons why the phosphorus content of this invention is specified to be not higher than 0.007 wt. % is explained as follows:

No. 1~No. 15 of Table 3 are compounded powders which the present inventors prepared so that the ratio of $Fe_2O_3$:MnO:ZnO of each compounded powder is in the same weight ratio of 70.6:14.2:15.2. Compounded powders of Nos. 1~15 are prepared by using powdered oxides of different kinds, and the phosphorus contents of the compounded powders are in the range of 0.0023~0.015 wt. % as shown in Table 3. Each compounded powder is sintered at a temperature of 1,350° C. to make a test piece of ring shaped soft ferrite having an outer diameter of 25 mm, an inner diameter of 15 mm and a thickness of 5 mm, and measured at an A.C. initial magnetic permeability $\mu iac$ and a relative loss factor $tan\delta/\mu iac$ at 1 KHz and 25° C. in accordance with JISC2561. The magnetic properties of each test piece are shown in Table 3 and in FIG. 1 and FIG. 2. As shown in Table 3 and in FIG. 1 and FIG. 2, the phosphorus contained in the compounded powder distinctly impairs the magnetic properties of soft ferrite.

By controlling the phosphorus content of the compounded powder to be not more than 0.005 wt. %, soft ferrite of excellent magnetic properties can be obtained.

The purified solution of the present invention has a phosphorus content not higher than 0.007 wt. % with respect to the total content of iron and manganese. By roasting the purified solution, iron and manganese contained in the purified solution are oxidized into iron oxide and manganese oxide, and then the phosphorus content with respect to the total content of iron oxide and manganese oxide is diluted. Further, in preparing the compounded powder, ZnO powder is introduced and the phosphorus content with respect to the compounded powder is diluted. Thus by using the purified solution, having a phosphorus content not higher than 0.007 wt. % with respect to the total content of iron and manganese, the compounded powder having a phosphorus content not higher than 0.005 wt. %, can be obtained.

This invention relates to a purified solution containing iron chloride and manganese chloride and characterized by a manganese content that is higher than 0.45 wt. % with respect to the total content of iron and manganese. An iron oxide containing 0.1~0.3 wt. % of manganese and having a lower phosphorus content is described in U.S. Patent Application Ser. No. 285,452, filed Dec. 16, 1988 by the same inventors as the present application. Herein, the manganese content of 0.1~0.3 wt. % of the previous application is less than 0.45 wt. % with respect to the total content of iron and manganese. Accordingly in the present invention, the manganese content is specified to be higher than 0.45 wt. %.

The purified solution of the present invention is produced by removing phosphorus from the crude solution. In this description, the crude solution means the solution being produced by dissolving ferromanganese, manganese ore or high manganese steel respectively or together in a hydrochloric acid solution. Further, since the waste hydrochloric pickling solution of steel contains free hydrochloric acid, the crude solution of the present invention can be also obtained by adding ferromanganese, manganese ore or high manganese steel, respectively or together, thereto. The crude solution also includes a solution where metallic manganese carbonate and/or steel scrap is further dissolved into the above explained crude solution. The manganese content as well as iron content in the crude solution is not specified, because it has no particular effect on the removal of the phosphorus from the crude solution. Furthermore, the concentration of hydrochloric acid in the crude solution and the temperature of the crude solution may sufficiently be the concentration and the temperature at which said materials can be dissolved, and are not specified in particular. Ferromanganese usually contains 0.03~0.12 wt. % of phosphorus, manganese ore usually contains 0.05~0.12 wt. % of phosphorus and steel usually contains 0.02 wt. % of phosphorus. In producing the crude solution, all of the phosphorus contained in the raw materials also dissolves into the hydrochloric acid solution and is contained in the crude solution. Accordingly, the crude solution contains not less than 0.02 wt. % of phosphorus with respect to the total contents of iron and manganese. Thus the crude solution contains phosphorus exceeding the permissible amount for high-quality soft ferrite.

The 1st step of the present method is the oxidation of the crude solution. During oxidation, the P contained in the crude solution is oxidized and becomes $P^{5+}$, wherein $P^{5+}$ forms more easily an insoluble compound in the later following steps than $P^{3+}$ or other states. The oxidation of the crude solution can be attained by bubbling air, but more effectively, it is desirable to add an oxidizer to the crude solution. For example, nitric acid solution, chloric acid solution, permanganic acid solution, or manganese dioxide, etc. can be used as an oxidizer. For example, by adding 20 lit. of nitric acid with a concentration of 60% in 1 $m^3$ of the crude solution, and boiling for an hour, P in the crude solution can be satisfactorily oxidized to the $P^{5+}$ state.

The 2nd step of the present method is adjusting the pH of the crude solution to 2.5~4.5. This adjustment of pH is performed so that $P^{5+}$ in the crude solution forms insoluble compounds.

As explained in the 1st step, P in the crude solution has an oxidation number of 5+, and $P^{5+}$ in the crude solution behaves as in the following formulas (2)~(4).

$$H_3PO_4 \rightleftharpoons H^+ + H_2PO_4^- \quad (2)$$

$$H_2PO_4^- \rightleftharpoons H^+ + HPO_4^{2-} \quad (3)$$

$$HPO_4^{2-} \rightleftharpoons H^+ + PO_4^{3-} \quad (4)$$

When the crude solution is acidic and has a low pH, the dissociation of formulas (3) and (4) does not take place, and $H_3PO_4$ and $H_2PO_4^-$ are only formed in the solution. Then the P cannot be removed as precipitate from the solution because $H_3PO_4$ and the metallic salts of $H_2PO_4^-$ are water soluble. When the pH of the crude solution is raised to 2.5 or above, dissociation of formulas (3) and (4) takes place whereby metallic salts of $HPO_4^{2-}$ and $PO_4^{3-}$ are insoluble in the crude solution, and they can be separated as insolubles from the crude solution.

This adjustment of pH may be performed by using, for example, an alkali compound such as aqueous ammonia. It also can be performed by dissolving, for example, a steel scrap into the crude solution, where $H^+$ ions of the crude solution are exhausted and the pH is adjusted thereby.

The 3rd step of the present method is a separation of insolubles from the solution. The insolubles formed in the 2nd step of the present method are separated from the solution and the purified solution of the present invention can be obtained.

However, in this separation of insolubles it should be understood that the insoluble phosphoric compounds formed in the 2nd step of the present method are very fine in size and they can be separated only by an ultrafilter treatment. The insoluble phosphoric compounds become large by agitating the solution after the pH of the solution is adjusted. Accordingly the insoluble phosphoric compounds can also be separated by the usual filter paper or filter cloth when the solution is subjected to the filtration after being agitated. Mechanical stirring of the solution for about 5 hours or more, or bubbling air through the solution for about 20 minutes or more are suitable for the agitation of the solution. In these treatments, a greater part of phosphorus contained in the solution is held in the precipitate, and a greater part of iron and manganese are held in the filtrate. Thus the purified solution of the present invention which contains iron chloride and manganese chloride and whose phosphorus content is not higher than 0.007 wt. % with respect to the total content of iron and manganese can be obtained.

The present inventors produced the crude solutions having the compositions shown in Nos. 1~5 of Table 2 by using various kinds of iron materials and manganese materials. No. 1 is the crude solution obtained by dissolving ferromanganese A of Table 1 in hydrochloric acid solution. No. 2 is a crude solution obtained by dissolving ferromanganese B of Table 1 in hydrochloric acid solution. No. 3 is a crude solution obtained by dissolving ferromanganese C of Table 1 in hydrochloric acid solution. No. 4 is a crude solution obtained by dissolving ferromanganese A of Table 1 in waste hydrochloric pickling solution of steel. No. 5 is a crude solution obtained by dissolving austenitic high-manganese steel and ordinary steel is hydrochloric acid solution.

Each of these solutions has a phosphorus content of 0.02 wt. % or above with respect to the total content of iron and manganese. These solutions are sprayed into the roasting furnace whose fluidized bed has a temperature of about 700° C., thereby obtaining a mixed oxide powder as shown in Nos. 1~5 of Table 2.

TABLE 2

| | | Composition of Solution | | | | Composition of mixed oxide powder (wt. %) | | |
|---|---|---|---|---|---|---|---|---|
| | No. | FeCl$_2$ | MnCl$_2$ | P | P/(Fe + Mn) | Fe$_2$O$_3$ | MnO | P |
| Crude Solution | 1 | 5.68 | 24.82 | 0.0065 | 0.0487 | 20.22 | 79.15 | 0.0380 |
| | 2 | 4.03 | 26.57 | 0.0079 | 0.0591 | 14.27 | 84.91 | 0.0455 |
| | 3 | 1.12 | 33.67 | 0.0034 | 0.0224 | 3.52 | 95.44 | 0.0168 |
| | 4 | 25.34 | 8.10 | 0.0032 | 0.0218 | 77.16 | 22.08 | 0.0157 |
| | 5 | 35.82 | 1.04 | 0.0048 | 0.0296 | 96.86 | 2.48 | 0.0203 |
| Purified Solution | 11 | 5.15 | 24.61 | 0.0007 | 0.0054 | 18.82 | 80.45 | 0.0040 |
| | 12 | 4.22 | 27.32 | 0.0008 | 0.0058 | 14.55 | 84.82 | 0.0043 |
| | 13 | 1.08 | 33.83 | 0.0006 | 0.0039 | 3.38 | 95.77 | 0.0029 |
| | 14 | 24.75 | 7.76 | 0.0007 | 0.0049 | 77.35 | 21.74 | 0.0034 |
| | 15 | 35.27 | 1.25 | 0.0007 | 0.0043 | 95.96 | 3.02 | 0.0031 |

These mixed oxide powders contain not less than 0.015% of phosphorus and cannot be used for high-quality soft ferrite. Nos. 11~15 of Table 2 represent the purified solution being dephosphorized according to the present invention. The purified solution No. 11 was obtained from the crude solution No. 1 of Table 2, No. 12 from No. 2, No. 13 from No. 3, No. 14 from No. 4, and No. 15 from No. 5. These purified solutions have remarkably lowered phosphorus contents, which, as shown in Nos. 11~15 of Table 2, are not higher than 0.007 wt. % with respect to the total content of iron and manganese. The mixed oxide powders of No. 11~15 of Table 2, obtained by spraying the purified solution of Nos. 11~15 into the roasting furnace at 700° C., showed phosphorus contents of not higher than 0.005 wt. %.

As shown in No. 1 and No. 11 of Table 2, for example, the $FeCl_2$ content and $MnCl_2$ content of the No. 1 solution are almost the same as the $FeCl_2$ content and $MnCl_2$ content of the No. 11 solution. This means that a greater part of iron and manganese in the crude solution are still in the purified solution after the treatment of the present method, and the loss of iron and manganese during the present method is very small.

The present inventors used the mixed oxide powder of No. 1~No. 15 of Table 2, supplied a shortage of iron oxide content or manganese oxide content with the high purity iron oxide or high purity manganese oxide of Table 1, and added further high purity zinc oxide thereto so that the compounded powders of Nos. 1~15 each contained $Fe_2O_3$:$MnO$:$ZnO$ in the weight ratio of 70.6:14.2:15.2. The mixed oxide powders of Nos. 1~15 are used for making the compounded powders of the corresponding No., respectively. Compounded powders of Nos. 1~15 were sintered at a temperature of 1,350° C. to make test pieces of ring shape having an outer diameter of 25 mm, an inner diameter of 15 mm and a thickness of 5 mm, and measured at an A.C. initial magnetic permeability $\mu$iac and a relative loss factor $\tan\delta/\mu$iac at 1 kHz and 25° C. in accordance with JIS C 2561, as explained earlier.

In Table 3 the compounding ratio of the mixed oxide powder of Table 2, the phosphorus content of the compounded powders, $\mu$iac and $\tan\delta/\mu$iac are shown. Nos. 1~5 of Table 3 used the mixed oxide powder obtained by roasting the crude solutions without the dephosphorizing treatment of the present method. A higher phosphorus content of compounded powder results when a high compounding ratio of the mixed oxide powders is used, and accordingly the sintered test piece will not have superior magnetic properties.

Consequently, mixed oxide powders of Nos. 1~5 cannot be used in large amount for manufacturing high-quality soft ferrite.

In Table 3, Nos. 11~15 represent the embodiments wherein the mixed oxide powders are produced by roasting the purified solution of the present invention. These embodiments have a low phosphorus content of not higher than 0.005 wt. % and always show excellent magnetic properties. Thus the mixed oxide powders produced from the purified solutions of the present invention do not raise the phosphorus content of the compounded powders, and therefore can be used as mixed oxide powders suitable for high-quality soft ferrite of excellent magnetic properties.

TABLE 3

| No. | Compounding Ratio of Mixed Oxide Powder (wt. %) | P Content of Compounded Powders (wt. %) | Magnetic Properties $\mu$iac | $\tan\delta/\mu$iac |
|---|---|---|---|---|
| 1 | 17.94 | 0.0086 | 7800 | $4.9 \times 10^{-6}$ |
| 2 | 16.72 | 0.0094 | 7300 | $5.3 \times 10^{-6}$ |
| 3 | 14.88 | 0.0044 | 8600 | $4.5 \times 10^{-6}$ |
| 4 | 64.31 | 0.0107 | 7500 | $5.8 \times 10^{-6}$ |
| 5 | 72.89 | 0.0150 | 6200 | $7.7 \times 10^{-6}$ |
| 11 | 17.65 | 0.0025 | 10750 | $3.9 \times 10^{-6}$ |
| 12 | 16.74 | 0.0025 | 10500 | $3.8 \times 10^{-6}$ |
| 13 | 14.83 | 0.0023 | 11200 | $3.5 \times 10^{-6}$ |
| 14 | 65.32 | 0.0028 | 10900 | $3.2 \times 10^{-6}$ |
| 15 | 73.57 | 0.0024 | 11400 | $3.3 \times 10^{-6}$ |

Using the purified solution of the present invention, a mixed oxide powder of iron oxide and manganese oxide, whose phosphorus content is sufficiently low can be obtained. These oxide powders can be produced at a lower cost than those obtained by the crystal refining method. The high-quality soft ferrite produced by using the mixed oxide powders produced from the present invention has the same excellent magnetic properties as those produced by using expensive high-purity oxide powders prepared by the crystal refining method.

What is claimed is:

1. A purified solution containing iron chloride and manganese chloride, having a P-content not higher than about 0.007 wt. % with respect to the total content of iron and manganese, and a Mn-content higher than about 0.45 wt. % with respect to the total content of iron and manganese.

2. A method for producing a purified solution of iron chloride and manganese chloride comprising the steps of: obtaining a crude solution by dissolving at least one ferro manganese, manganese ore and high manganese steel in a hydrochloric acid solution or waste hydrochloric pickling solution of steel; oxidizing the crude solution by blowing air and/or adding an oxidizer; adjusting the pH of the solution to about 2.5~4.5 to produce insolubles; and separating the insolubles from the solution.

3. A purified solution containing iron chloride and manganese chloride and being produced from a crude solution obtained by dissolving at least one of ferromanganese, manganese ore and high manganese steel in a hydrochloric acid solution or waste hydrochloric pickling solution of steel, said purified solution having a P-content not higher than about 0.007 wt. % with respect to the total content of iron and manganese, and a Mn-content higher than about 0.45 wt. % with respect to the total content of iron and manganese.

* * * * *

UNITED STATES PATENT AND TRADEMARK OFFICE
CERTIFICATE OF CORRECTION

PATENT NO. : 5,200,159
DATED : April 6, 1993
INVENTOR(S) : Naoe HIRAI et al.

It is certified that error appears in the above-identified patent and that said Letters Patent is hereby corrected as shown below:

Claim 2, column 8, line 40, "ferro manganese" should read --of ferromanganese--.

Signed and Sealed this

Eleventh Day of January, 1994

Attest:

BRUCE LEHMAN

Attesting Officer      Commissioner of Patents and Trademarks